United States Patent
Hsu et al.

(10) Patent No.: US 12,008,865 B2
(45) Date of Patent: Jun. 11, 2024

(54) GAME DEVICE CAPABLE OF GENERATING A PLURALITY OF GAME RESULTS BY BETTING

(71) Applicant: Tien-Shu Hsu, Taichung (TW)

(72) Inventors: Shun-Tsung Hsu, Taichung (TW); Chang-Yi Wang, Taichung (TW)

(73) Assignee: TIEN-SHU HSU, Taichung (TW)

( * ) Notice: Subject to any disclaimer, the term of this patent is extended or adjusted under 35 U.S.C. 154(b) by 55 days.

(21) Appl. No.: 17/761,334

(22) PCT Filed: Sep. 29, 2019

(86) PCT No.: PCT/CN2019/109075
§ 371 (c)(1),
(2) Date: Mar. 17, 2022

(87) PCT Pub. No.: WO2021/056543
PCT Pub. Date: Apr. 1, 2021

(65) Prior Publication Data
US 2022/0343737 A1    Oct. 27, 2022

(51) Int. Cl.
*G07F 17/32* (2006.01)
*G06F 7/58* (2006.01)
*G06Q 50/34* (2012.01)

(52) U.S. Cl.
CPC .......... *G07F 17/3288* (2013.01); *G06F 7/582* (2013.01); *G06Q 50/34* (2013.01); *G07F 17/3211* (2013.01); *G07F 17/3225* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 2006/0157927 A1 | 7/2006 | O'Halloran et al. | |
| 2011/0287841 A1* | 11/2011 | Watanabe | G07F 17/329 463/42 |
| 2016/0005266 A1* | 1/2016 | Kawashima | E05B 65/0003 463/20 |
| 2020/0105103 A1* | 4/2020 | Hsu | G07F 17/3267 |

FOREIGN PATENT DOCUMENTS

| | | |
|---|---|---|
| CN | 101065743 A | 10/2007 |
| CN | 101927090 A | 12/2010 |
| CN | 102349095 A | 2/2012 |
| CN | 103845894 A | 6/2014 |
| TW | 1418388 B | 12/2013 |

* cited by examiner

*Primary Examiner* — Ronald Laneau
(74) *Attorney, Agent, or Firm* — MUNCY, GEISSLER, OLDS & LOWE, PC (57) ABSTRACT

A game device capable of generating a plurality of game results by betting, including a betting tabletop, an imaging unit, a game result generating unit, a compensation unit, and a processor. The processor determines whether a game satisfies a specified condition and then decides whether to generate an overweight signal and makes the game result generating unit generate a specified number of game results when the overweight signal exists, and the specified number is greater than 1. On this basis, in a round game, the plurality of game results can be generated by means of the game result generating unit, to satisfy the requirements of a player for obtaining a plurality of game results by a bet, the running of the game is accelerated, and the operating efficiency of the game is increased.

23 Claims, 9 Drawing Sheets

GAME DEVICE CAPABLE OF GENERATING A PLURALITY OF GAME RESULTS BY BETTING

FIELD OF THE INVENTION

The present invention relates to a game device, and more particularly to a game device providing chance to generate multiple times of game results.

BACKGROUND OF THE INVENTION

Roulette table games, which have characteristics of high odds, easy to get started, and being not easy to cheat, are highly popular among players. Currently, the general game results of the common roulette table games include single number, odd number, even number, designated number set, etc. Different game results have different official payout odds, such as if the game result is any one of a single number of "1~36", the odds are generally 1 to 35, which is converted into a recovery rate of about 94.59% for the player. Since the player's recovery rate for betting various game results in roulette table games is fixed and below 100%, it is not attractive for players who play games over a long period of time.

Therefore, such as Taiwan patent No. 1418388 discloses a device applied to roulette table games, which can be used to dynamically increase the odds of a roulette table game, and has the feature of dynamic odds of raise that change constantly may be higher than the original payout odds to increase the odds, increase the expected period of the roulette table game, as well as motivate players to bet, causing the players to expect additional rewards from the roulette table game, and increasing the attractiveness of the roulette table game.

In addition, in order to allow the players to have multiple chances of winning jackpot in the process of a round of the game, the game can also be used in conjunction with Taiwan patent No. 1418388, which discloses a random accumulative triggering system for jackpot. When the accumulated amount of bets exceeds a randomly generated threshold, the game system generates a jackpot game, so that the players can obtain an additional jackpot in the process of a round of the game, thereby satisfying the desire to obtain the jackpot multiple times.

As mentioned above, although it can meet the players' desire to win the jackpot multiple times in the process of a round of the game, there is an additional cost to design the jackpot game, and the players need to re-learn the method of playing the jackpot game, which will delay the game process. In addition, in using the dynamic odds of raise to attract the players, although there is no delay in the game process, in order to control the players' recovery rate to ensure that the operator retains the deserved profit, a quantity of the dynamic odds of raise cannot be effectively increased. When the players cannot get the jackpot of the dynamic odds of raise over a long period of time, the players will feel the game being manipulated and lose trust in the game.

SUMMARY OF THE INVENTION

A main object of the present invention is to allow players to have a chance to win multiple times of jackpot in a round of a game without delaying the process of the game.

In order to achieve the above object, the present invention provides a game device proving a chance to generate multiple times of game results after betting. The game device is provided for a player to play a game, and the game comprises a plurality of game results. The game device comprises a bet table, a display, a game result generating unit, a payout unit and a processor. Wherein the bet table includes a plurality of bet areas corresponding to the plurality of game results, and the plurality of bet areas are provided for the player to bet and to generate a bet information; the display displays a real-time image of the game; and the game result generating unit is provided to generate any one of the plurality of game results.

The processor is connected to the bet table, the display, and the game result generating unit, wherein the game device is configured to pay the player based on the bet information and the game result generated by the game result generating unit and the processor is configured to perform the following steps:

step S1: betting procedure, the processor providing a bet time interval to allow the player betting in the bet time interval and to generate the bet information thereof;

step S2: determining procedure, the processor determining whether the game meets a specified condition to generate a raise signal;

step S3: game result generating procedure, the processor demanding the game result generating unit to generate the game results with a specified quantity if the raise signal is generated, wherein the specified quantity is greater than one; and if the raise signal is not generated, the game result generating unit is demanded to generate only one game result; and step S4: payout procedure, the processor commanding the game device to pay to the player after at least one game result is generated.

Accordingly, in a round of the game, when the processor determines that the game meets the specified condition and generate the raise signal, the processor demands the game result generating unit to generate more than one game results. Therefore, with the game result generating unit, there is a chance to generate multiple times of game results to meet the player's demand of obtaining multiple times of the game results in one round of the game. The present invention uses the same game result generating unit to generate the game results to save costs, and at the same time, the player does not need to learn the way of playing a new game, so the game process can be speed up and the operation efficiency of the game can be improved.

DETAILED DESCRIPTION OF THE PREFERRED EMBODIMENTS

The detailed description and technical content of the present invention are described with reference to the accompanying drawings as follows.

Figure 1:
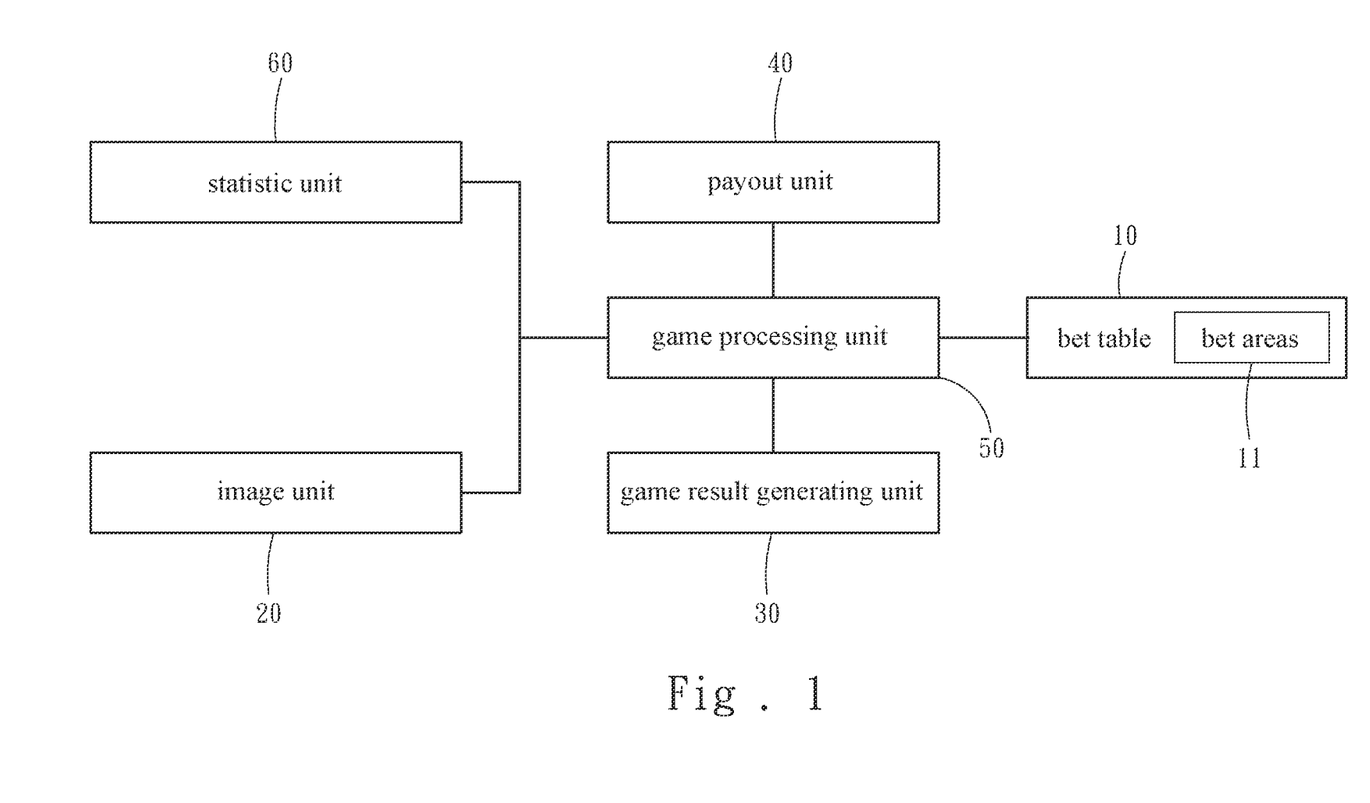
FIG. 1 is a system block diagram according to a first embodiment of the present invention.
Figure 2:
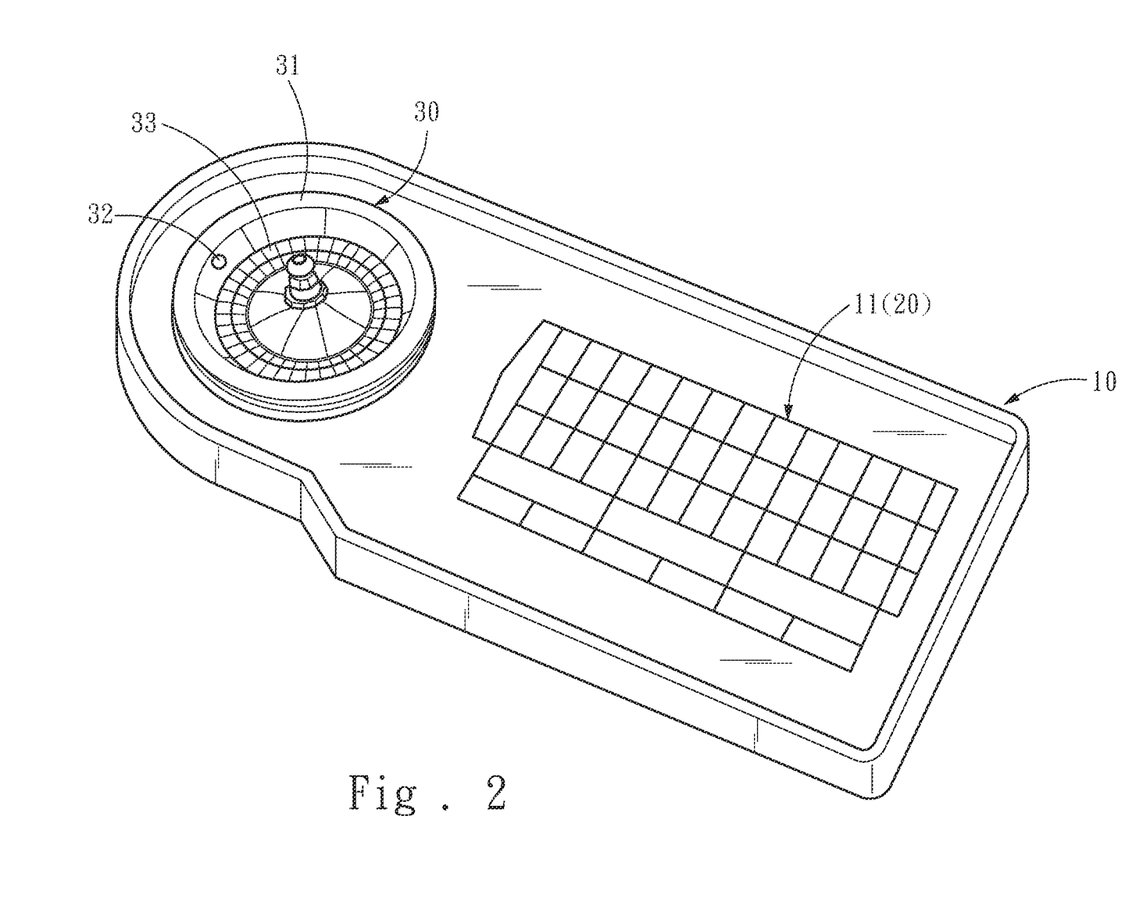
FIG. 2 is a perspective view of a physical machine according to an embodiment of the present invention.

Referring to FIG. 1 and FIG. 2, the present invention is a game device providing a chance to generate multiple times of game results after betting, and the game device is provided for a player to play a game. The game includes a plurality of game results, and the game device comprises a bet table 10, a display 20, a game result generating unit 30, a payout unit 40 and a processor 50. The bet table 10 includes a plurality of bet areas 11 corresponding to the plurality of game results, the plurality of bet areas 11 are provided for the player to bet and to generate a bet information, and the display 20 displays a real-time image of the game. In one embodiment, the bet table 10 and the display 20 are integrated into a touch screen, and the plurality of bet areas 11 of the bet table 10 are directly displayed on the display 20.

The game result generating unit 30 is provided to generate any one of the plurality of game results. Taking a roulette game as an example, the game result generating unit 30 generates any one of the numbers selected from 1 to 36. In one embodiment, the game result generating unit 30 is implemented by a physical rotating roulette 31, a rolling ball 32, and a sensor 33 that senses a resting position of the rolling ball 32 to obtain a corresponding number. In another embodiment, the game result generating unit 30 is a random number generator (not shown in the figures) for generating numbers randomly, and a virtual roulette rolling screen (not shown in the figures) is displayed in the display 20.

The payout unit 40 pays to the player according to the bet information and the game result generated by the game result generating unit 30. That is, the player obtains the corresponding jackpot according to the odds and bet selections set up by the game rules.

Figure 3:
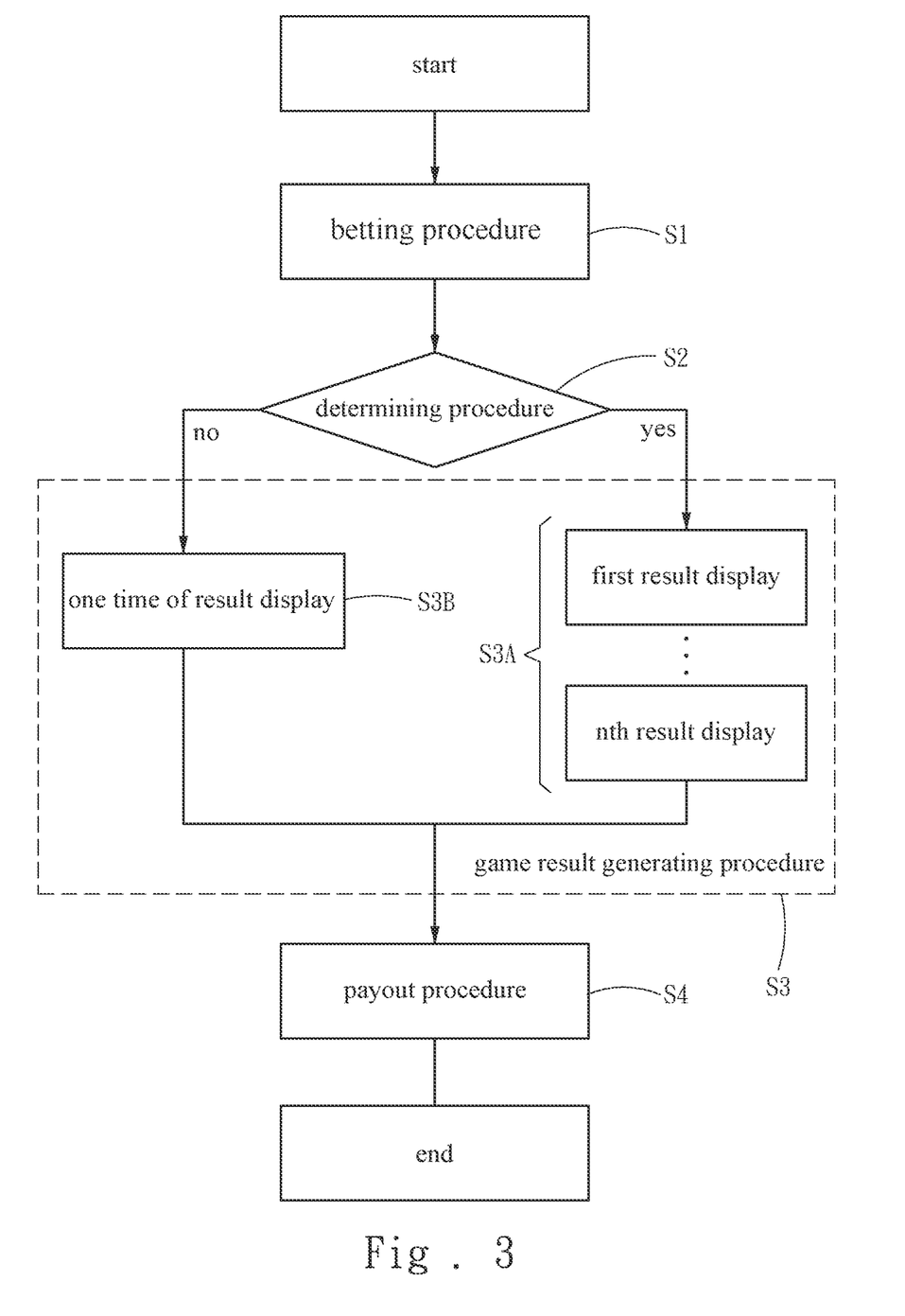
FIG. 3 is a flow chart of operation according to an embodiment of the present invention.

Referring to FIG. 1 and FIG. 3, the processor 50 is connected to the bet table 10, the display 20, the game result generating unit 30 and the payout unit 40, and the processor 50 performs the following steps:

step S1: betting procedure, the processor 50 providing a bet time interval to allow the player betting in the bet time interval and to generate the bet information thereof;

step S2: determining procedure, the processor 50 determining whether the game meets a specified condition to decide whether to generate a raise signal;

step S3: game result generating procedure, the processor 50 demanding the game result generating unit 30 to generate the game results with a specified quantity if the raise signal is generated, wherein the specified quantity is greater than one. If the raise signal is not generated, the game result generating unit 30 is demanded to generate only one game result; and step S4: payout procedure, after at least one game result is generated, the processor 50 commanding the payout unit 40 to pay to the player.

Further, in step S2, an embodiment of implementing the determining procedure is described as an example as follows. As shown in FIG. 1, the present invention further includes a statistic unit 60, which is connected to the processor 50. The statistic unit 60 accumulates and counts a bet value of which the player bets on the plurality of bet areas 11 as an accumulative bet amount. The accumulative bet amount is returned to an initial value when the specified condition is met, wherein the initial value can be zero. The specified condition is that the accumulative bet amount exceeds a specified threshold, which is randomly generated between a specified upper limit value and a specified lower limit value in an interval range. The specified upper limit value and the specified lower limit value are variable values, which can be automatically changed randomly or manually changed by an operator. In order to encourage the player to place more bets, a value of the specified quantity is positively correlated with a value of the accumulative bet amount. That is, the higher the accumulative bet amount, the higher the value of the specified quantity, thereby increasing the attraction to the player.

As shown in FIG. 3, in step S3, the game result generating procedure is further divided into step S3A: first to nth game result display and step S3B: one time of game result display. When the game result generating unit 30 generates the game results with the specified quantity, step S3A: first to nth game result display is performed, and n is a value of the specified quantity. When step S3A is performed, the game results with the specified quantity can be generated at the same time. For example, n rolling balls can be simultaneously appeared in the roulette game, and a last number at which each of the rolling balls stops is the game result. Alternatively the game results with the specified quantity are generated sequentially; that is, only one of the rolling balls in a rolling state appears in the roulette game, and the first game result is generated after the first rolling ball stops, and the second rolling ball will be generated successively to generate the second game result. When the game result generating unit 30 generates only one game result, step S3B: one time of game result display is performed.

Figure 4:
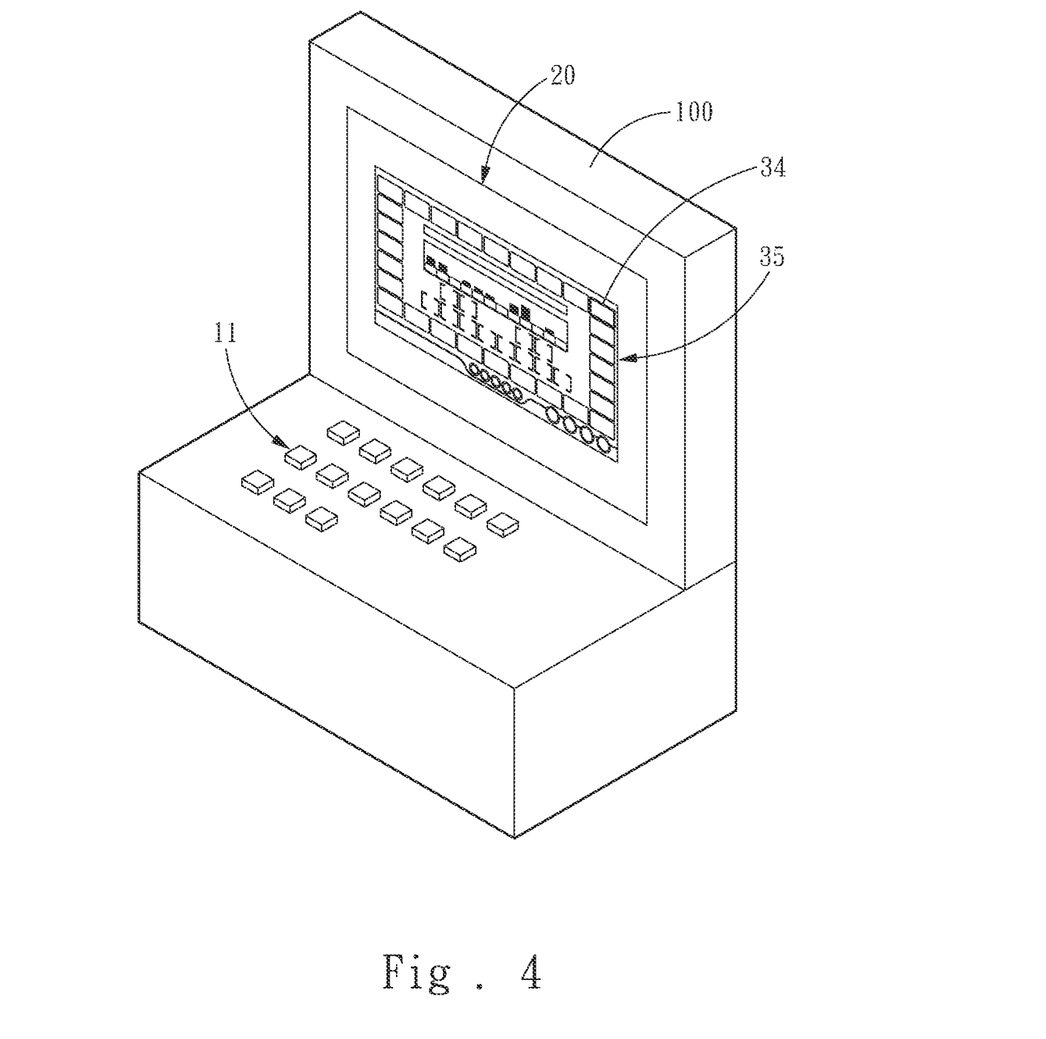
FIG. 4 is a perspective view of a physical machine according to another embodiment of the present invention.

Referring to FIG. 1 and FIG. 4, wherein FIG. 4 shows a perspective view of a physical machine according to another embodiment of the present invention. In addition to applying to the physical rotating roulette 31 as shown in FIG. 2, the present invention can also be applied to a score-running game (e.g. Mario slot machine), dice or similar games. As shown in FIG. 4, if the present invention is applied to a score-running game (Mario slot machine), there are the display 20 and the plurality of bet areas 11 disposed on a game machine 100, and the game result generating unit 30 shows as a bright frame 34, which moves over a plurality of patterns 35. When the bright frame 34 stops at any one of the plurality of patterns 35, the game result is the pattern 35 correspondingly. The plurality of bet areas 11 corresponds to the plurality of game results, that is, corresponds to the plurality of patterns 35, and each of the plurality of patterns 35 has a different odds. Accordingly, the player freely places bets on the plurality of bet areas 11 to generate the bet information, so that the payout unit 40 pays to the player based on the bet information and the game result generated by the game result generating unit 30.

Figure 5:
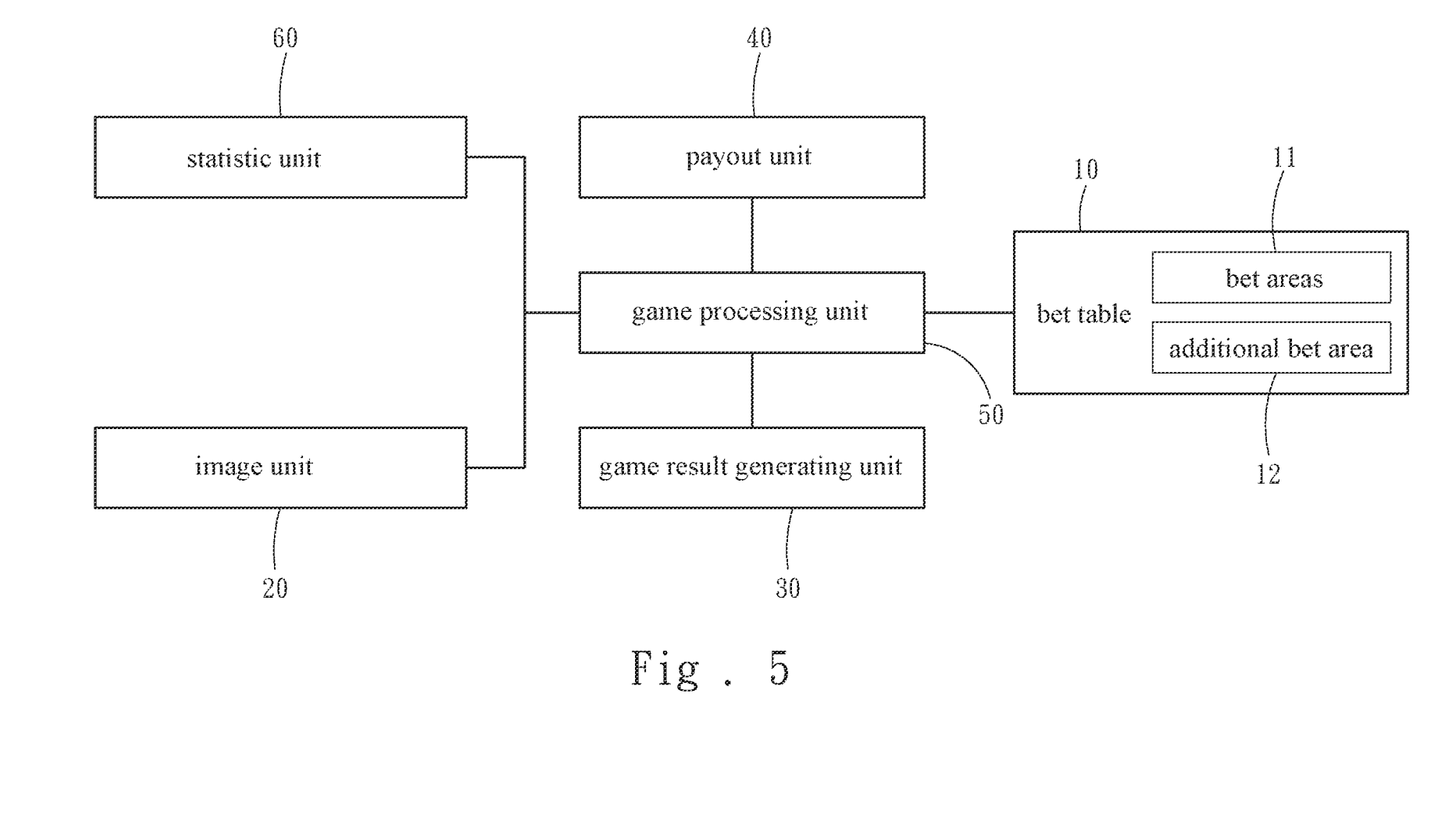
FIG. 5 is a system block diagram according to a second embodiment of the present invention.

Referring to FIG. 5, it shows a system block diagram according to a second embodiment of the present invention. The bet table 10 further includes an additional bet area 12, which is provided for the player to bet and to generate an additional bet thereof. For example, points, scores, items or treasures obtained during the game process can be used as chips to bet in the additional bet area 12 and further to generate the additional bet. The statistic unit 60 accumulates the additional bet as an accumulative additional bet. Specifically, the statistic unit 60 accumulates the additional bet of each round of the game betted by the player. When the player bets in the bet time interval, the bet information and the additional bet are generated. At this time, the specified condition is that whether there is an additional bet, or whether the accumulative additional bet exceeds a specified threshold, and furthermore, a value of the specified quantity is positively correlated with a value of the accumulative additional bet.

Figure 6:
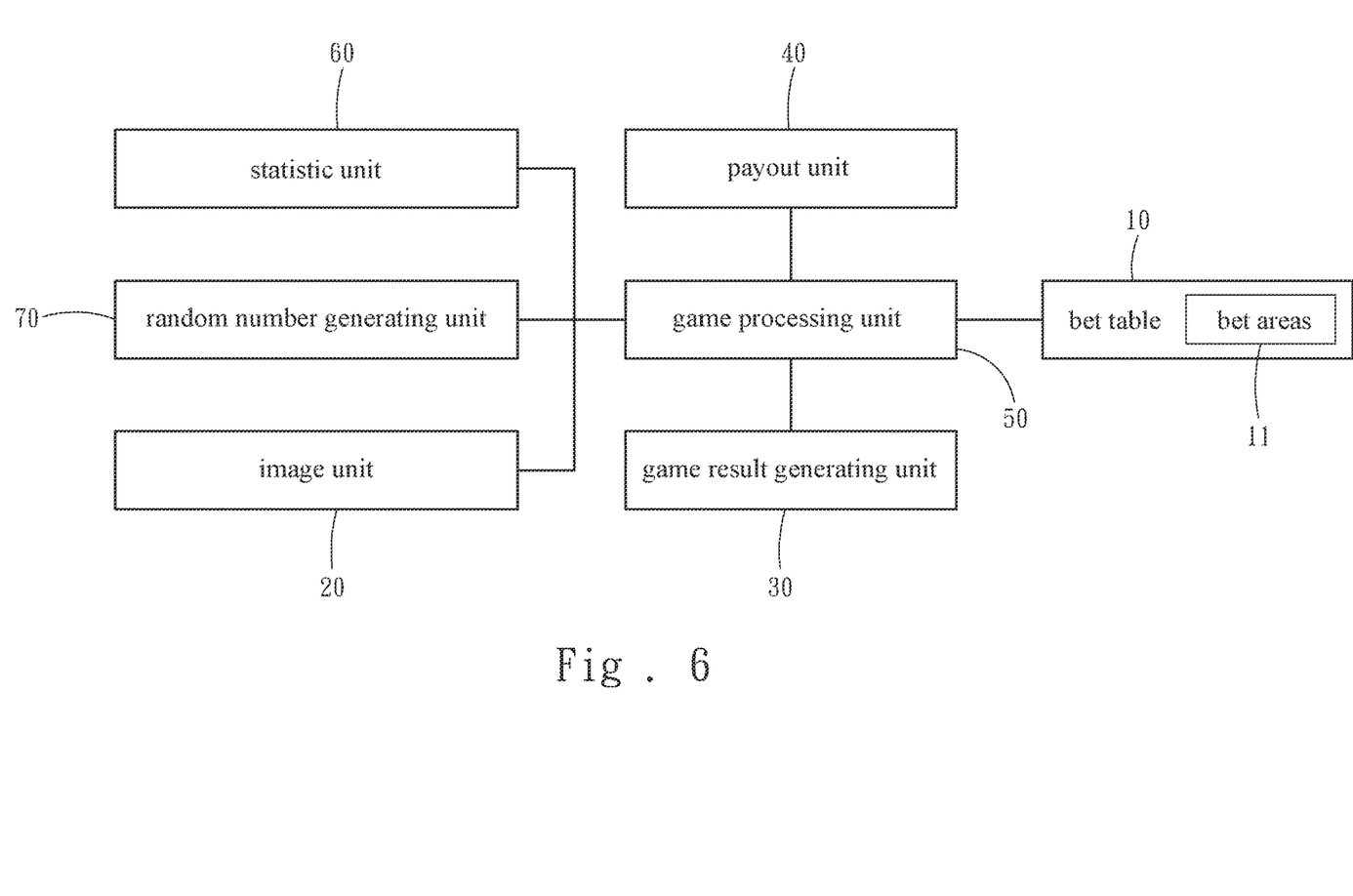
FIG. 6 is a system block diagram according to a third embodiment of the present invention.

Referring to FIG. 6, it shows a system block diagram according to a third embodiment of the present invention. In this embodiment, the present invention further includes a random number generating unit 70, which randomly generates two random numbers and is connected to the processor 50. The specified condition is that the two random numbers are the same number. In other words, if the two random numbers are the same, the specified condition is met. Practically, the random numbers generated by the random number generating unit 70 are selected from a predetermined group of numbers. Namely, a user can control a probability of meeting the specified condition by controlling the quantity of the predetermined group of numbers.

Figure 7:
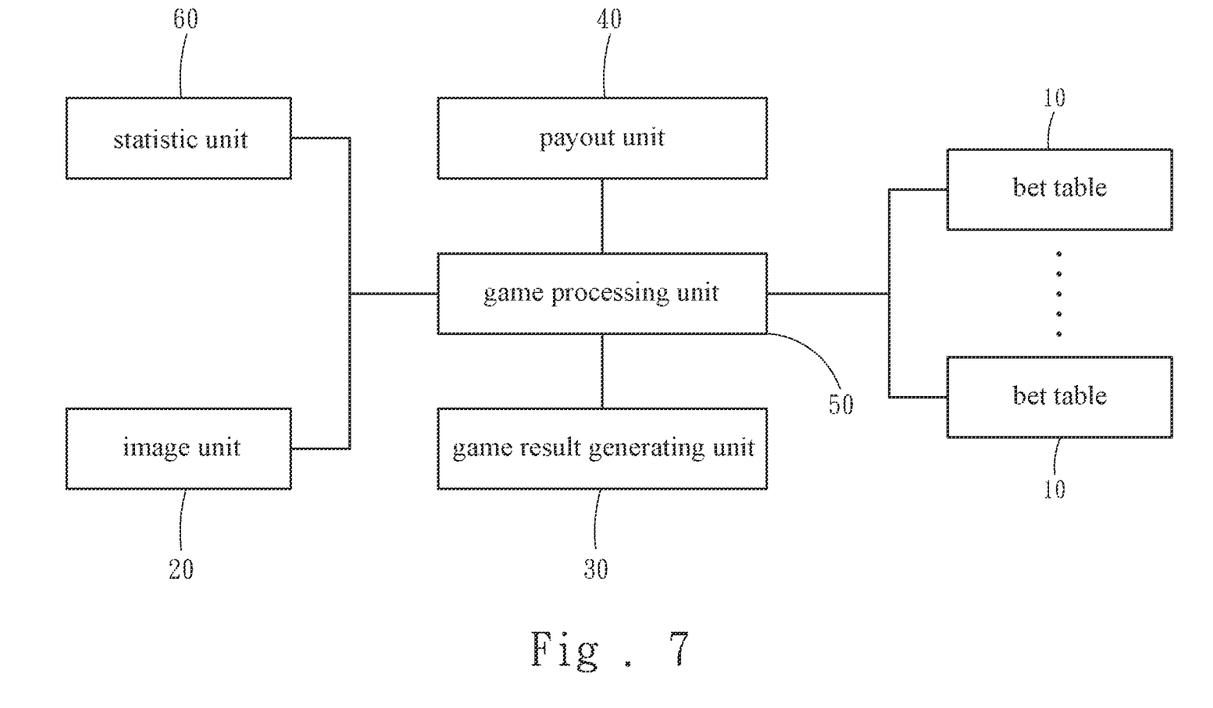
FIG. 7 is a system block diagram according to a fourth embodiment of the present invention.

Referring to FIG. 7, it shows a system block diagram according to a fourth embodiment of the present invention. In this embodiment, the game device comprises another one or more bet tables which provided to another one or more players correspondingly, such that to meet the demand of providing multi-players used together.

Figure 8:
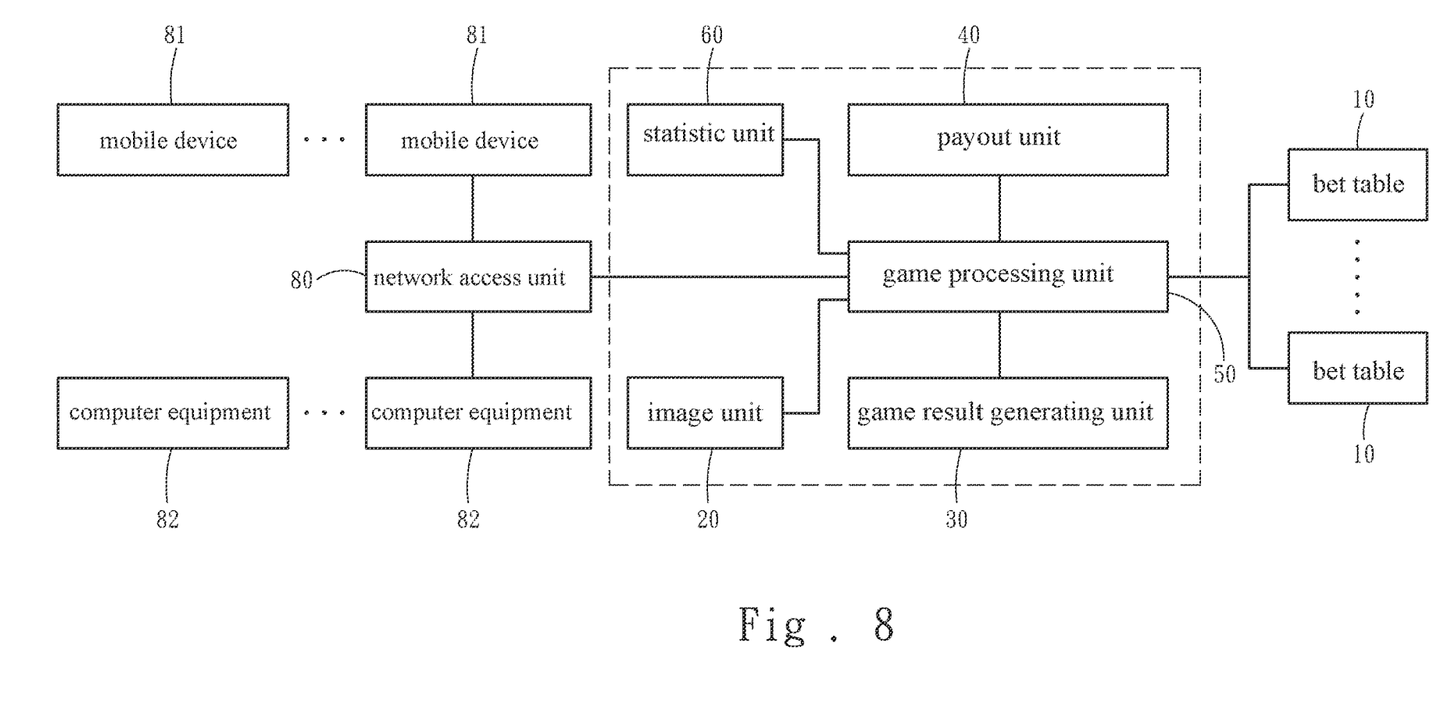
FIG. 8 is a system block diagram according to a fifth embodiment of the present invention.

Referring to FIG. 8, it shows a system block diagram according to a fifth embodiment of the present invention. In this embodiment, the present invention further includes a network access unit 80, which is connected to the processor 50. The network access unit 80 is remotely connected to a plurality of mobile devices 81 and a plurality of computer equipment 82, thereby the demand of using remotely by multi-players can be met.

Figure 9:
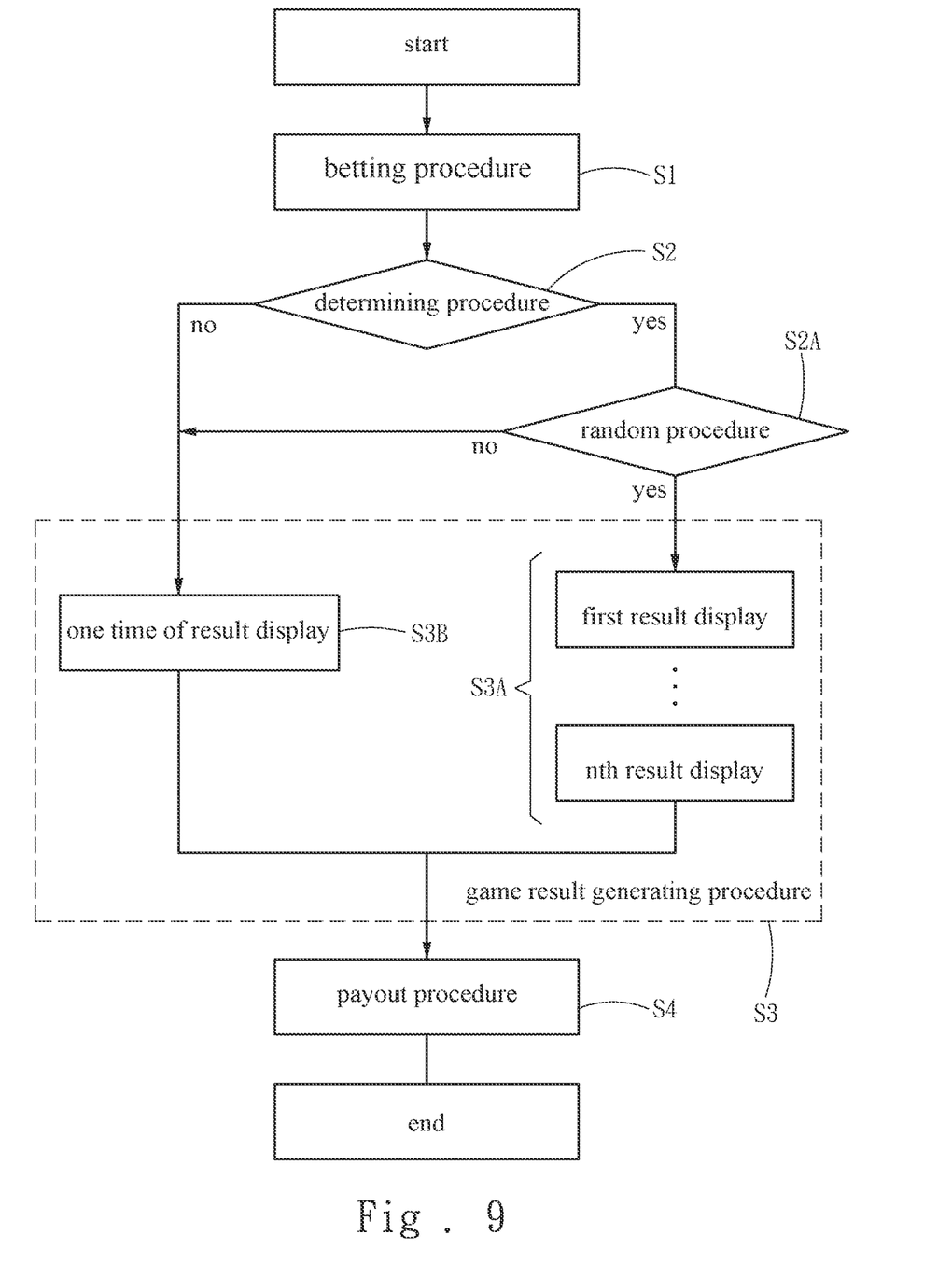
FIG. 9 is a flow chart of operation according to another embodiment of the present invention.

In addition, referring to FIG. 9, it shows a flow chart of operation according to another embodiment of the present invention. The processor 50 of the present invention directly performs the following steps:

step S1: betting procedure, the processor 50 providing a bet time interval to allow the player betting in the bet time interval and to generate the bet information thereof;

step S2: determining procedure, the processor 50 determining whether the game meets a specified condition to decide whether further enter step S2A: random procedure, the processor 50 generating a raise signal in a random manner. Specifically, the specified condition is that the accumulative bet amount exceeds a specified threshold as described in the first embodiment, or the additional bet generates, or the accumulative additional bet exceeds the specified threshold as described in the second embodiment, or the two random numbers are the same number as described in the third embodiment. The foregoing only exemplifies the preferred embodiments, and the implementation manner is not limited thereto. Accordingly, in step S2A, the effect of the random procedure is to allow the present invention to generate the raise signal in a random manner. In other words, in the step S2A, the random procedure has two conditions, a first condition is that the raise signal is generated, and a second condition is that the raise signal is not generated.

step S3: game result generating procedure, the processor 50 demands the game result generating unit 30 to generate the game results with a specified quantity if the raise signal is generated, wherein the specified quantity being greater than one. If the raise signal is not generated, the game result generating unit 30 is demanded to generate only one game result; and step S4: payout procedure, the processor 50 commanding the payout unit 40 to pay to the player after at least one game result is generated.

In summary, the advantages of the present invention at least include:

1. In one round of the game, the game result generating unit generates multiple times of game results to meet the player's demand.

2. Use the same game result generating unit to generate the plurality of game results without the need to design a new game to save costs. At the same time, the player does not need to study a new way for playing a new game, so the game process can be speed up and the operation efficiency of the game can be improved.

3. The value of the specified quantity is a non-fixed value which increases while the accumulative bet amount or the accumulative additional bet increases, thereby meeting the player's demand for winning a grand prize.

4. The different game results are generated at the same time, which can greatly shorten the time required for playing the game and meet the demand of speeding up the game process.

5. More than one of the bet tables can be set, meeting the demand for multi-players playing together.

6. Through the setting of the network access unit, the remote player can use mobile device or computer equipment to connect and play.

What is claimed is:

1. A game device providing a chance to generate multiple times of game results after betting, the game device provided for a player to play a game and the game comprising a plurality of game results, the game device comprising:

a bet table, the bet table including a plurality of bet areas corresponding to the plurality of game results, and the plurality of bet areas provided for the player to bet and to generate a bet information;

a display, the display displaying a real-time image of the game;

a game result generating unit, the game result generating unit provided to generate any one of the plurality of game results;

a processor, the processor connected to the bet table, the display, the game result generating unit, wherein the game device is configured to pay the player based on the bet information and the game result generated by the game result generating unit and the processor is configured to performing the following steps:

step S1: betting procedure, providing a bet time interval to allow the player betting in the bet time interval and to generate the bet information thereof;

step S2: determining procedure, determining whether the game meets a specified condition to generate a raise signal;

step S3: game result generating procedure, demanding the game result generating unit to generate the game results with a specified quantity if the raise signal is generated, wherein the specified quantity is greater than one; and if the raise signal is not generated, the game result generating unit is demanded to generate only one game result; and step S4: payout procedure, commanding the game device to pay to the player after at least one game result is generated.

2. The game device as claimed in claim 1, wherein the game device further comprises a statistic unit connected to the processor, and the statistic unit accumulates and counts a bet value of which the player bets on the plurality of bet areas as an accumulative bet amount, wherein the specified condition is the accumulative bet amount exceeding a specified threshold, and a value of the specified quantity is positively correlated with a value of the accumulative bet amount.

3. The game device as claimed in claim 2, wherein the specified threshold is randomly generated between a specified upper limit value and a specified lower limit value in an interval range.

4. The game device as claimed in claim 1, wherein the game results with the specified quantity are generated at the same time.

5. The game device as claimed in claim 1, wherein the game results with the specified quantity are generated sequentially.

6. The game device as claimed in claim 1, wherein the game device comprises another one or more bet tables which provided to another one or more players correspondingly.

7. The game device as claimed in claim 1, wherein the game device further comprises a network access unit connected to the processor, and the network access unit is provided for remotely connecting with a plurality of mobile devices and a plurality of computer equipment.

8. A game device providing a chance to generate multiple times of game results after betting, the game device provided for a player to play a game and the game comprising a plurality of game results, the game device comprising:
a bet table, the bet table including a plurality of bet areas corresponding to the plurality of game results, and the bet table further including an additional bet area, the plurality of bet areas provided for the player to bet and to generate a bet information, and the additional bet area provided for the player to bet and to generate an additional bet;
a display, the display displaying a real-time image of the game;
a game result generating unit, the game result generating unit provided to generate any one of the plurality of game results;
a statistic unit, the statistic unit configured to accumulate the additional bet of each round of the game as an accumulative additional bet; and
a processor, the processor connected to the bet table, the display, the game result generating unit, and the statistic unit, wherein the game device is configured to pay the player based on the bet information and the game result generated by the game result generating unit, and the processor is configured to perform the following steps:
step S1: betting procedure, providing a bet time interval to allow the player betting in the bet time interval and to generate the bet information and the additional bet thereof;
step S2: determining procedure, determining whether the game meets a specified condition to generate a raise signal, wherein the specified condition is the accumulative additional bet exceeding a specified threshold;
step S3: game result generating procedure, demanding the game result generating unit to generate the game results with a specified quantity if the raise signal is generated, wherein the specified quantity is greater than one, and a value of the specified quantity is positively correlated with a value of the accumulative additional bet; and if the raise signal is not generated, the game result generating unit is demanded to generate only one game result; and
step S4: payout procedure, commanding the game device to pay to the player after at least one game result is generated.

9. The game device as claimed in claim 8, wherein the specified threshold is randomly generated between a specified upper limit value and a specified lower limit value in an interval range.

10. The game device as claimed in claim 8, wherein the plurality of game results with the specified quantity is generated at the same time.

11. The game device as claimed in claim 8, wherein the plurality of game results with the specified quantity is generated sequentially.

12. The game device as claimed in claim 8, wherein the game device comprises another one or more bet tables which provided to another one or more players correspondingly.

13. The game device as claimed in claim 8, wherein the game device further comprises a network access unit connected to the processor, and the network access unit is provided for remotely connecting with a plurality of mobile devices and a plurality of computer equipment.

14. A game device providing a chance to generate multiple times of game results after betting, the game device provided for a player to play a game and the game comprising a plurality of game results, the game device comprising:
a bet table, the bet table including a plurality of bet areas corresponding to the plurality of game results, and the plurality of bet areas provided for the player to bet and to generate a bet information;
a display, the display displaying a real-time image of the game;
a game result generating unit, the game result generating unit provided to generate any one of the plurality of game results;
a random number generating unit, the random number generating unit configured to randomly generate two random numbers; and
a processor, the processor connected to the bet table, the display, the game result generating unit, and the random number generating unit, wherein the game device is configured to pay the player based on the bet information and the game result generated by the game result generating unit, and the processor is configured to perform the following steps:
step S1: betting procedure, providing a bet time interval to allow the player betting in the bet time interval and to generate the bet information thereof;
step S2: determining procedure, determining whether the game meets a specified condition to generate a raise signal, wherein the specified condition is that the two random numbers are the same;
step S3: game result generating procedure, demanding the game result generating unit to generate the game results with a specified quantity if the raise signal is generated, wherein the specified quantity is greater than one; and if the raise signal is not generated, the game result generating unit is demanded to generate only one game result; and
step S4: payout procedure, commanding the game device to pay to the player after at least one game result is generated.

15. The game device as claimed in claim 14, wherein the game results with the specified quantity are generated at the same time.

16. The game device as claimed in claim 14, wherein the game results with the specified quantity are generated sequentially.

17. The game device as claimed in claim 14, wherein the game device comprises another one or more bet tables which provided to another one or more players correspondingly.

18. The game device as claimed in claim 14, wherein the game device further comprises a network access unit connected to the processor, and the network access unit is provided for remotely connecting with a plurality of mobile devices and a plurality of computer equipment.

19. A game device providing a chance to generate multiple times of game results for a player to play a game after betting, the game comprising a plurality of game results, the game device comprising:
- a bet table, the bet table including a plurality of bet areas corresponding to the plurality of game results, and the plurality of bet areas provided for the player to bet and to generate a bet information;
- a display, the display displaying a real-time image of the game;
- a game result generating unit, the game result generating unit provided to generate any one of the plurality of game results;
- a processor, the processor connected to the bet table, the display, and the game result generating unit, wherein the game device is configured to pay the player based on the bet information and the game result generated by the game result generating unit, and the processor is configured to perform performing the following steps:
  - step S1: betting procedure, providing a bet time interval to allow the player betting in the bet time interval and to generate the bet information thereof;
  - step S2: determining procedure, determining whether the game meets a specified condition to further enter step S2A: random procedure, generating a raise signal in a random manner;
  - step S3: game result generating procedure, demanding the game result generating unit to generate the game results with a specified quantity if the raise signal is generated, wherein the specified quantity is greater than one; and if the raise signal is not generated, the game result generating unit is demanded to generate only one game result; and
  - step S4: payout procedure, commanding the game device to pay to the player after at least one game result is generated.

20. The game device as claimed in claim 19, wherein the game results with the specified quantity are generated at the same time.

21. The game device as claimed in claim 19, wherein the game results with the specified quantity are generated sequentially.

22. The game device as claimed in claim 19, wherein the game device comprises another one or more bet tables which provided to another one or more players correspondingly.

23. The game device as claimed in claim 19, wherein the game device further comprises a network access unit connected to the processor, and the network access unit is provided for remotely connecting with a plurality of mobile devices and a plurality of computer equipment.

* * * * *